(12) United States Patent
Moe et al.

(10) Patent No.: US 7,957,743 B2
(45) Date of Patent: Jun. 7, 2011

(54) SELF CONFIGURING AND OPTIMIZATION OF CELL NEIGHBORS IN WIRELESS TELECOMMUNICATIONS NETWORKS

(75) Inventors: Johan Moe, Mantorp (SE); Harald Kallin, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 805 days.

(21) Appl. No.: 11/773,752

(22) Filed: Jul. 5, 2007

(65) Prior Publication Data

US 2008/0207207 A1    Aug. 28, 2008

(51) Int. Cl.
*H04W 36/00* (2009.01)

(52) U.S. Cl. ........ 455/439; 455/436; 455/437; 455/440; 455/443

(58) Field of Classification Search ........... 455/436–444
See application file for complete search history.

(56) References Cited

U.S. PATENT DOCUMENTS

| | | | | |
|---|---|---|---|---|
| 5,949,771 A * | 9/1999 | DeClerck et al. | ............. | 370/331 |
| 2002/0071403 A1 * | 6/2002 | Crowe et al. | .................. | 370/331 |
| 2005/0265279 A1 * | 12/2005 | Markovic et al. | ............. | 370/328 |
| 2005/0266853 A1 * | 12/2005 | Gallagher et al. | ............. | 455/439 |
| 2006/0056351 A1 * | 3/2006 | Wall | .............. | 370/331 |
| 2006/0240829 A1 * | 10/2006 | Hurst | ............................ | 455/436 |
| 2007/0121549 A1 * | 5/2007 | Yun et al. | ....................... | 370/331 |
| 2007/0135147 A1 * | 6/2007 | DeClerck et al. | ............. | 455/501 |
| 2007/0140163 A1 * | 6/2007 | Meier et al. | ................... | 370/329 |
| 2007/0147377 A1 * | 6/2007 | Laroia et al. | ................... | 370/392 |
| 2007/0291770 A1 * | 12/2007 | Kitazoe | .................... | 370/395.52 |
| 2008/0159236 A1 * | 7/2008 | Ch'ng et al. | .................. | 370/335 |

FOREIGN PATENT DOCUMENTS

| EP | 1720373 A | 11/2006 |
|---|---|---|
| GB | 2 331 892 | 2/1999 |
| WO | WO 96/38014 | 11/1996 |
| WO | WO 2005/032190 | 4/2005 |

* cited by examiner

*Primary Examiner* — Kent Chang
*Assistant Examiner* — Ronald Eisner
(74) *Attorney, Agent, or Firm* — Roger S. Burleigh

(57) ABSTRACT

The present invention relates to a cellular communications network and in particular to the problem of identifying cells for neighbor lists, or handover candidates when the cells are identified by a limited number of non-unique identities. The present invention includes a method for a radio base station, wherein the base station receives reports from one or more terminals in neighbor cells quality and non-unique identities. The match is sought in a neighbor cell list non-unique identity with a unique cell identity. If the match cannot be made without ambiguity, the base station causes the terminal to detect the unique cell identity. If the reason for the ambiguity is the particular cell is not included in the neighbor cell list it is included when its unique identity has been established. The uniquely identified cell is used if it is determined to perform a handover.

17 Claims, 4 Drawing Sheets

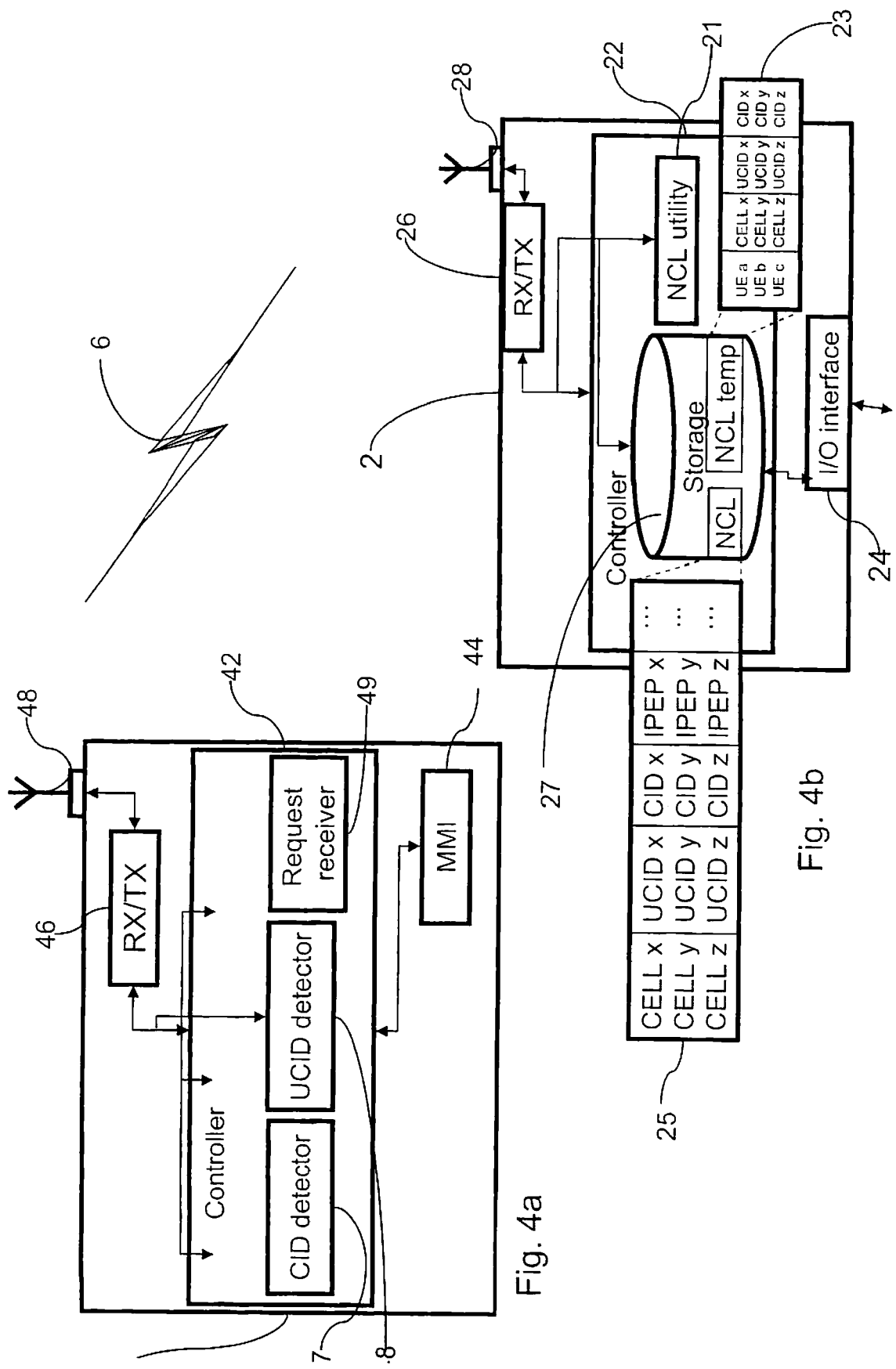

SELF CONFIGURING AND OPTIMIZATION OF CELL NEIGHBORS IN WIRELESS TELECOMMUNICATIONS NETWORKS

TECHNICAL FIELD

The present invention relates to self configuring and optimization of cell neighbors in wireless telecommunications networks.

BACKGROUND OF THE INVENTION

FIG. 1 of the accompanying drawings illustrates a wireless telecommunications network 10, which support communication with terminals in a number of cells (A, B, C, D) each of which is served by a radio base station 2. Each communication cell covers a geographical area, and by combining a number of cells a wide area can be covered. A mobile terminal 4 is illustrated communicating in cell A, and is able to move around the network 10.

A base station 2 contains a number of receivers and transmitters to give radio coverage for one or more cells. Each base station 2 is connected to a network "backbone", or core network infrastructure (not shown), which enables communications between base stations and other networks. The example system of FIG. 1 shows one base station per cell.

An important concept in such a network is the cell and its neighbors. During a call a mobile terminal 4 typically is moved in the geography, and when so doing leaves a first cell and enters a new cell that neighbors the first cell. The cell may be changed several times and the process of changing the cell that supports a radio link with the terminal is called handover. A list of the known neighbors, the so called "neighbor cell set", is important both for the network 10 and for the mobile terminal 4 to enable reliable handover between cells. The network 10 can store information relating to a set of neighbor cells for each cell in the system. Evaluation of the best cell for supporting a radio link with the mobile terminal is based upon measurements made by the terminal on the serving cell and on other cells than the serving cell. The neighbor cell list is needed for mapping measurements and handover decisions to a target cell identity and possibly applying specific parameters or rules for the target cell. It will be readily appreciated that the cell boundaries are not sharply defined, but will in practice be somewhat blurred as the range of the base stations will overlap with one another.

In existing systems, the mobile terminal 4 detects and measures cell operating parameters for neighboring cells by measuring on their broadcast channels. One measured operating parameter is a cell non-unique identifier which typically consists of a physical layer identifier such as a scramble code which is non-uniquely assigned to the cell. Operating parameters also relates to the signal quality of the neighbor cell such as signal strength, signal quality and timing information. When the quality of a neighbor cell is considered better than the current serving cell, a handover from the serving cell to the chosen neighbor cell is executed by the network. The neighbor cell then becomes the serving cell for the mobile terminal.

Typically in a WCDMA (wideband code division multiple access) system, the mobile terminal detects Common Pilot Channel (CPICH) transmissions from surrounding cells, in order to determine id (scramble code) and timing information.

When the mobile reports the neighbor cell signal quality measurements to the network, the cells' respective identities become important. Typically, cell identities are reused for more than one cell. The reuse of identities means that cells may be confused with one other, since the serving cell may have neighbor cells sharing the same identity information.

In the cells are also broadcasted unique cell identities. The unique cell identity is carried on the network layer. Its main use is for special purpose terminals that are used by an operator of the system for testing and tracing of problems in the network. The unique cell identity is not repeated as often as the non-unique cell identity and is more complicated for a terminal to detect. This is in contrast to the physical layer which carries physical data needed for supporting the radio link.

Since the cells' physical layer identifiers are non-unique, populating and maintaining the neighbor cell sets can never be fully automatic. Human efforts are needed to resolve conflicts where the serving cell has multiple neighbors using the same non-unique identifier. A further problem is handover failures owing to the candidate cell having been incorrectly identified.

SUMMARY OF THE PRESENT INVENTION

It is an objective of the present invention is to ensure that handovers are made to the correct cell. It includes a method for a radio base station or for a node controlling a radio base station serving a first cell comprising the steps of, receiving from a terminal a non-unique cell identity of a second cell and a measure on the quality of the second cell, determining if the second cell can be unambiguously identified by the information in a neighbor cell list, and if ambiguity in the second cell identity is determined, ordering the terminal to identify and report on the unique second cell identity, and associating the non-unique identity with the unique identity.

In a first embodiment of the present invention, ambiguity on the second cell identity is identified if the non-unique cell identity is not included in the neighbor cell list. The association is then made by including the second cell non-unique cell identity and the unique cell identity in the neighbor cell list. In a second embodiment of the present invention, ambiguity on the second cell identity arises if two unique cell identities in the neighbor cell list have the same non-unique identity. The association with the unique cell identity with the non-unique cell identity is then made for the specific radio link with the terminal for a period. The period is typically started when the signal strength of the second cell exceeds a predefined threshold value, and ends when a handover is performed or the second cell signal strength decreases below a second threshold value.

The present invention also relates to a radio base stations or a node controlling radio base stations and that is adapted for performing the method.

The invention also includes a method for mobile stations that are adapted to measure the signal quality on broadcast channels in other cells than the first cell, to detect the non-unique cell identity on broadcast channels having a quality exceeding a threshold value, transmitting information on the signal quality and second cell non-unique identity to the serving cell and upon receiving a command, detecting the unique cell identity on a broadcast channel and transmitting the unique cell identity.

The invention further relates to a mobile station adapted for performing the foregoing method.

An advantage of the present invention is that creation and or updating of a neighbor cell list can be made automatically by the system based on the measurements and cell identity information received from the terminals. Thereby, it is not necessary for humans to plan and maintain the neighbor cell lists.

BRIEF DESCRIPTION OF THE DRAWINGS

The invention will now be described with reference to exemplary embodiments in conjunction with the accompanying figures in which:

FIG. 4a is a block diagram of a mobile terminal according to an embodiment of the present invention.

FIG. 4b is a block diagram of a base station according to an embodiment of the present invention.

DETAILED DESCRIPTION OF THE PREFERRED EMBODIMENTS

The present invention is adapted to make a positive identification of a neighboring cell that is ambiguously detected by a mobile terminal. The ambiguity may arise when a cell, not previously detected, is reported by a mobile terminal, or when two or more cells share the same non-unique cell identity and the two cells. An ambiguity will then arise as to what cell that has been measured.

The problem exists in several systems, for example Global System for Mobile Communications (GSM), Wideband Code Division Multiple Access (WCDMA) and eUTRAN. In GSM and WCDMA, a list of neighbor cells is created for each cell in the system by a human or at least controlled by a human. In so doing any collisions in the non-unique cell identities of the neighbors should be detected and possibly solved by reallocating the non-unique cell identities. It is cumbersome to establish and update the neighbor cell list (NCL) and the allocations of non-unique cell identities, especially when the capacity of a network is increased by the addition of further cells.

For WCDMA and eUTRAN it is desired that the NCL can, if not be completely created automatically, at least be updated automatically by the system based on measurements made by terminals on cells other than the cell serving the terminal. For that reason, the present invention is in particular important for WCDMA and eUTRAN, however, it may well be implemented also in other systems such as GSM.

The present invention is primarily implemented in a network node that handles the NCL and determines handovers. In the eUTRAN this is the task of the eNodeB which is a base station, in GSM it is the Base Station Controller (BSC) and in WCDMA, it is the Radio Network Controller (RNC) that handles the NCL. Both the BSC and the RNC have the functions of controlling base stations and their operation on the various cells of the networks. The term base station controller in this application refers to a node having the functions of the BSC or the RNC.

Figure 1:
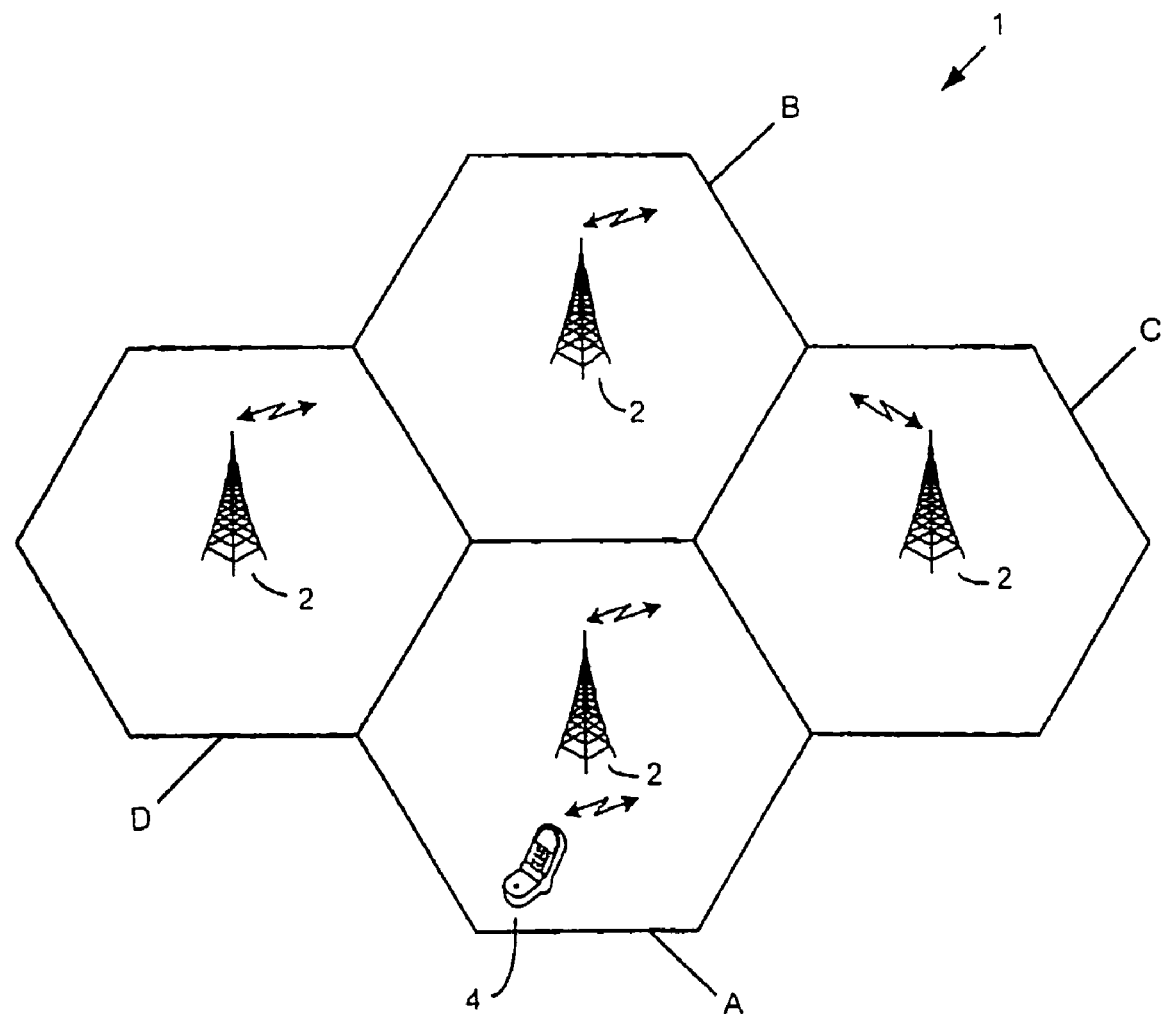
FIG. 1 illustrates a cellular wireless telecommunications network.
Figure 2:
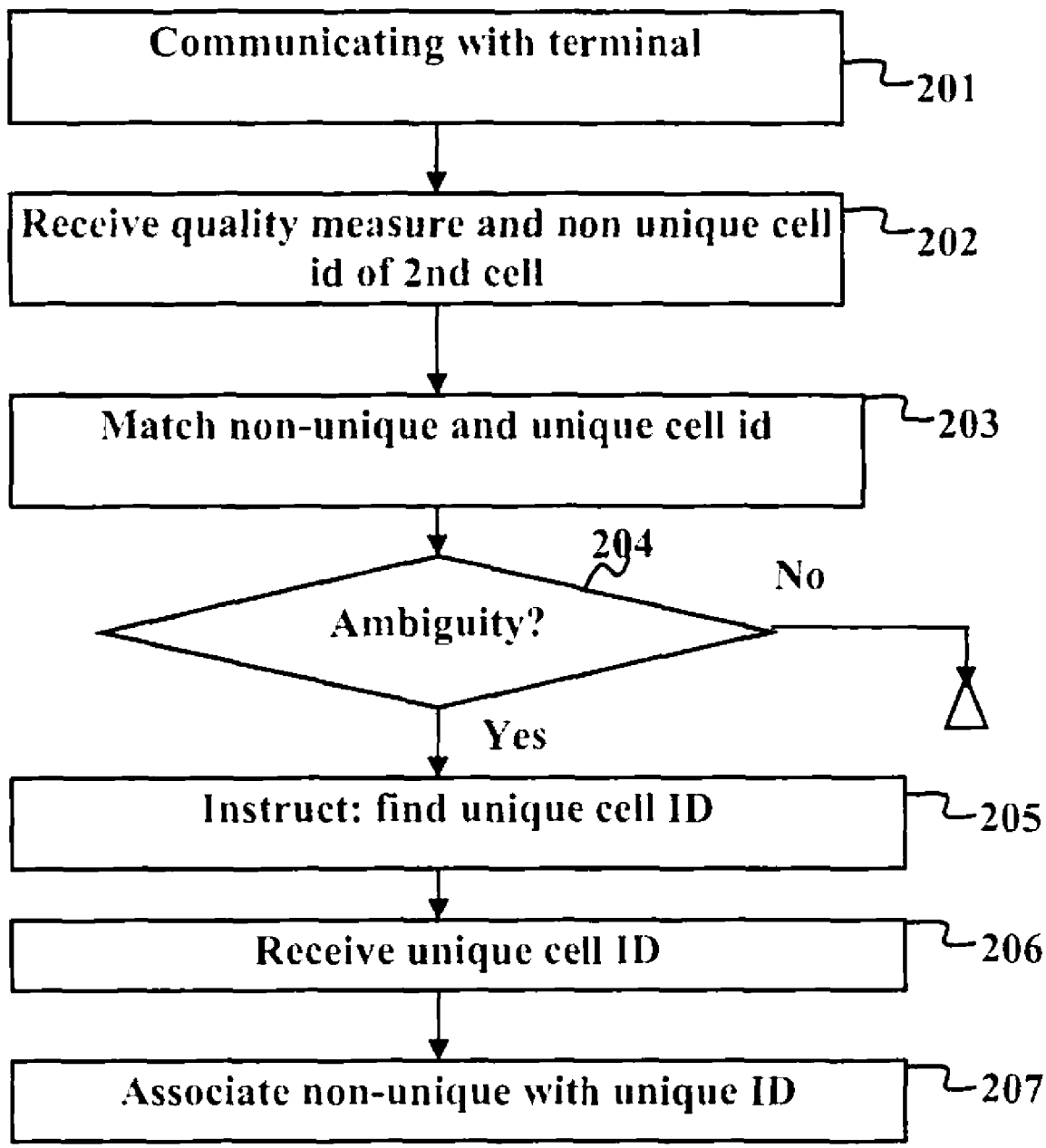
FIG. 2 illustrate the steps of a method for a base station or a base station controller according to an embodiment of the present invention.

FIG. 2 is a flow chart of the steps performed by a radio base station or a base station controller. For facilitating the description only the base station is mentioned when describing the method. It should be understood that the steps are alternatively carried out by the base station controller. In the first step 201, a communications link with a terminal in a first cell is supported. The base station receives, in step 202, a report from the terminal on a quality measure and a non-unique cell identity of a second cell. Next, in step 203, the base station retrieves the NCL to match the non-unique cell identity with a unique cell identity. If, in step 204, the match is made without any ambiguity the method is ended with respect to the second cell. If however ambiguity arises in the match, the base station instructs, in step 205, the terminal to detect the unique cell identity of the second cell. The base station receives the unique cell identity in step 206, and in a last step 207, the non-unique cell identity is associated with the unique cell identity within the NCL.

There are several reasons why the ambiguity may arise in the match between non-unique cell identity and the unique cell identity. The first, and primary reason is the second cell is not included in the NCL. Another reason is the NCL includes an indicator of suspected ambiguity. The indicator may have been added to the NCL prior to the method being performed. The reason may be handovers to the identified cell have failed. The failure may be detected when a terminal re-establishes contact with the first cell as a serving cell during a handover process, or the target cell has not sent notification to the first cell as serving cell. A further reason for ambiguity occurs when two or more unique cell identities share the same non-unique cell identity.

If the reason for the ambiguity is that the second cell with its unique and non unique cell identities is not included in the NCL, they are added to the NCL in the last associating step 207.

The base station frequently receives, in step 202, reports from the terminal on measures made on other cells, not only the second cell. When the base station has received, in step 206, the second cell unique identity as detected by the terminal it does not instruct the terminal to detect the second cell unique identity when again receiving, in step 202, a quality measure from the terminal, even if the ambiguity in the NCL is maintained. Therefore, the associating step 207, associates the unique cell identity with the non-unique cell identity for the particular terminal for a specific period or as long as the signal quality of the second cell exceeds a predefined threshold. The association with the particular terminal is not made in the NCL, instead a temporary NCL is used.

As long as the second cell unique cell identity is associated with the terminal, if a decision is made to handover to the second cell, it will be directed via the associated second cell unique identity. In such case, the second cell will be instructed to prepare a handover of the terminal, before the terminal itself is instructed to make a handover to the second cell.

In addition to the requirement of ambiguity in the match of unique cell identity to the non-unique cell identity, the further requirement of the second cell quality measure exceeding a threshold value can be added before the terminal is instructed to detect the second cell unique identity. The reason for adding the further requirement is to avoid the expense of the terminal performing the detection. The unique cell identity is transmitted from base stations at a much less frequent interval than the physical layer identity. In order to receive and decode this information, mobile terminal 4 may have to shortly interrupt its communication with the serving cell.

Moreover, some filtering of the measurement data may be needed before the second cell is added to the NCL in the associating step 207. For example, the second cell is not included in the NCL until it has been reported by two or more mobile terminals. In this manner, adding a distant cell that was detected under exceptional propagation conditions is avoided, for example, during operation of a mobile terminal 4 located in an aircraft.

Additionally in step 207, the cell lookup maps the unique cell identity (UCID) to the address of the realizing node of that cell. For example, in LTE, this can be an ordinary DNS, mapping the cell identity to an IP address. The IP address in turn points to the RBS realizing the cell.

Figure 3:
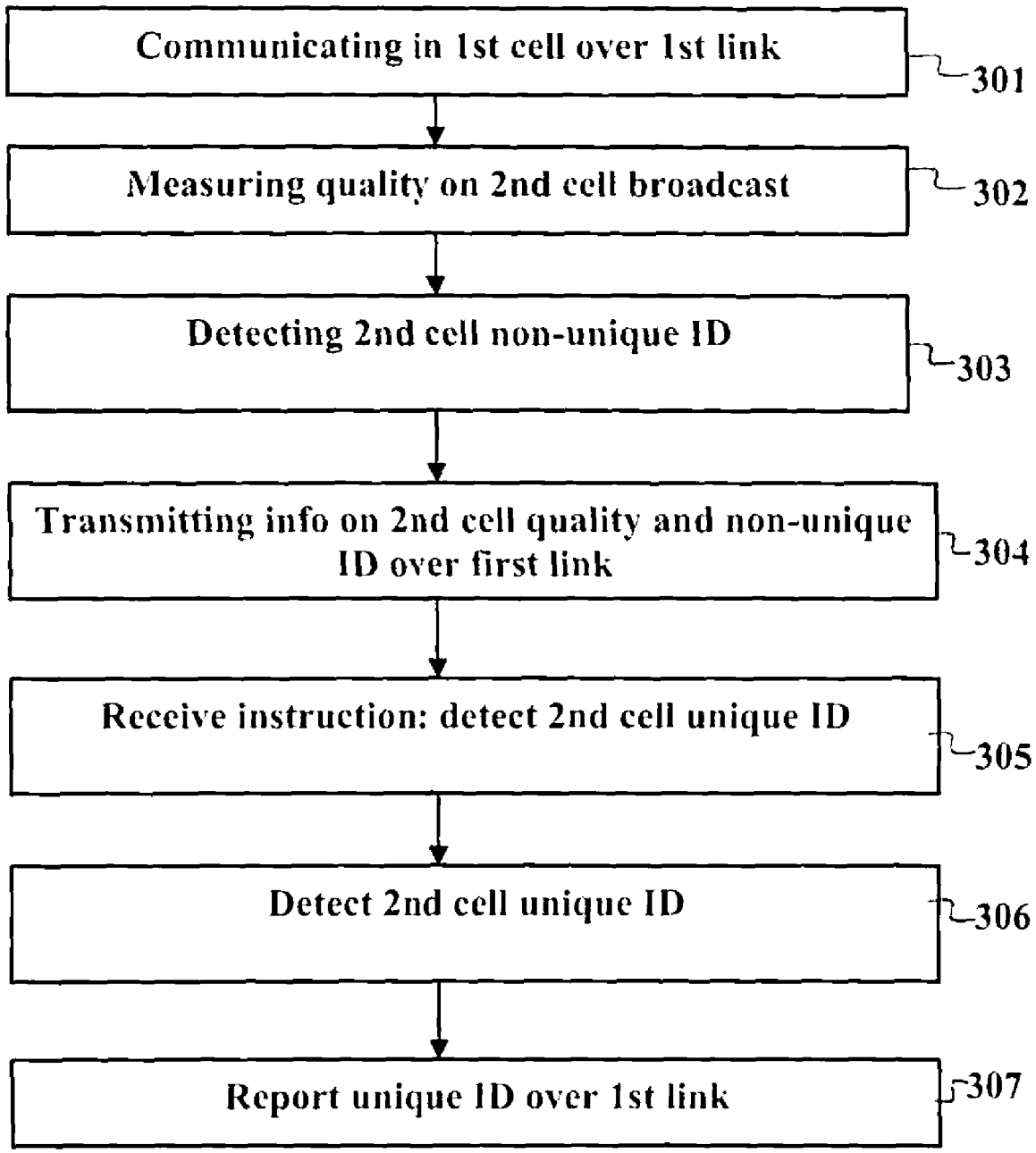
FIG. 3 illustrate steps of a method for a terminal according to an embodiment of the present invention.

FIG. 3 is a flowchart of the steps to be performed by a mobile terminal. In a first step 301, the terminal is in communication with the first cell over a first radio link. In step 302, the terminal measures the quality of a broadcast channel transmitted in a second cell, and detects, in step 303, the second cell non-unique identity as sent on layer 1 communication. In step 304, the terminal transmits the second cell non-unique identity, and quality measure over the first link. The quality measure and the non-unique identity are tied together in the transmission. In step 305, the terminal receives an instruction over the first link to detect the second cell unique identity. In step 306, the terminal detects the second cell unique identity as broadcasted on the network layer. In the step 307, the terminal transmits the second cell unique identity over the first link.

The terminal 4 scans the spectrum to find broadcast channels of potential neighbor cells. The ability to detect and measure a broadcast channel depends on the sensitivity of the hardware in the terminal transceiver and of the broadcast channel power relative to the interference level. A further prerequisite for detecting the second cell identity of the potential neighbor cell in step 303 may be added, that being that the broadcast channel reception quality as detected in step 302, exceeds a threshold value. If the non-unique cell identity is not detected, the second cell is, of course, not informed to the network, in step 304.

FIG. 4a is a block diagram of the parts of a mobile terminal 4 that are essential for the implementation of the present invention. The mobile terminal 4 comprises a controller 42, a man machine interface (MMI) 44, a radio transceiver 46, and an antenna 48. The controller 42 of the mobile terminal 4 serves to control communications with the base station 2 via the transceiver 46 and antenna 48, over the air interface 6. This means the controller 42 has the function of receiving control messages from the base station, and controlling the operation of the mobile terminal in accordance with the control messages. Data detected by the transceiver passes through controller 42. The controller reads control information on the physical layer. With respect to measures on cells other than the serving cell, the controller 42 receives the measures on the reception quality and identifies the non-unique cell identity. The controller further collects measurements and the associated non-unique cell identities and reports them to the radio base stations regularly. The controller is equipped with a CID (cell identity) detector 47 for identifying the non-unique cell identity in the physical layer information. While the terminal blocks and functions hereinbefore described are known in the art, the present invention includes additional controller functions as hereinafter described. The controller has a request receiver 49, arranged for detecting a control message from the serving base station for identifying the unique cell identity of a cell of a non-unique cell identity. When such a request has been received, the controller 42, causes the transceiver 46 to detect data on the second cell broadcast channel, until the unique cell identity has been identified. The controller 42 is equipped with a UCID detector that reads the information on the network layer, as received form the transceiver. The controller 42 causes the transceiver to continue detecting data on the broadcast channel until the UCID detector has found the unique cell identity. Inasmuch as the unique cell identity is repeated with long intervals, the identification of the unique cell identity requires the transceiver to detect the broadcast channel for a longer time period than if only the non-unique identity need be detected.

The CID detector 47, the UCID detector 48, and the request receiver 49 are preferably implemented as software (SW) modules, however, they may also be implemented in hardware or in a combination of the two.

Interactions with the user of the device take place using the MMI 44, which can include a key pad, microphone, loudspeaker and display device, for example.

FIG. 4b is a block diagram of a base station 2 which communicates with mobile terminals via an air interface 6. Only blocks essential for the present invention are disclosed. The base station 2 includes an input/output (I/O) interface 24, a radio transceiver 26, an antenna 28 and a controller 22. The controller communicates with mobile terminals via the transceiver 26 and antenna 28 over the air interface 6. The controller 22 also communicates with the rest of the telecommunications network via the I/O interface 24. In the controller of the present invention, the controller also includes NCL utility 21, a storage device 27, a temporary NCL 23, and an NCL 25. The controller retrieves the NCL for identifying the unique cell identifiers for the non-unique cell identifiers reported by the terminals. The NCL unit monitors if the match between non-unique and unique cell identity can be made without ambiguity. If an ambiguity exists, the NCL utility 21 initiates an instruction to be sent to the terminal for it to report the unique cell identity of the non-uniquely identified cell. When the unique cell identity is reported by the terminal, the NCL utility 21 causes the unique and the non-unique cell identity to be listed and associated with the terminal identity in the temporary NCL. A further condition for listing the non-unique cell identity in the temporary NCL is the reported reception quality being above a first threshold level. The NCL utility 22 also causes the non-relevant association to be deleted. Typically this is made when the signal strength of a cell on the temporary NCL decreases below a second threshold level. Alternatively the data base 27 with NCL and temporary NCL are located outside the controller and coupled to it.

Typically the controller will also determine when to cause a handover from the serving base station to a target base station serving the second cell, or other cells that function temporarily as a second cell.

In an alternative to the base station described with reference to FIG. 4b, controller 22 can be located in a radio network controller. The radio network controller with an internal controller is then coupled to at least one radio base station transceiver. The functions of the internal controller 22 will then be the same as that described with respect to the radio base station.

Base station 2 and mobile terminal 4 which operate in accordance with the present invention are also adapted to carry out the method of the present invention as described below with reference to FIGS. 3 to 6. It will be appreciated that the various functional units can be provided by the controller 42, 22, or by other specific units in the devices, or network 10.

The use of unique cell identifiers (UCID) results in there being unambiguous information relating to the identity of the neighbor cells, and so confusion regarding those neighboring cells is removed. Using the fast and low-resource demanding non-unique cell identity for most of the measurements facilitates efficient resource usage within mobile terminal 4 and rapid handover to the neighboring cells. Mobile terminal 4 is only requested to retrieve the more cumbersome unique cell identifier when a new neighbor is detected, or when an audit of the relation between the non-unique and unique cell identity seems appropriate.

All cell relations can be continuously evaluated. Inputs to that evaluation are mobile terminal reports and events, network events and operator input. The result of the evaluation is that the cell or cell relations will retain different properties. This can also be seen as the cell relation being in different states.

The major advantage of embodiments of the present invention is that each removes the need for manual involvement within the process of maintaining neighbor sets. The operator can then determine to fully neglect the concept of neighbors and let the system take care of the neighbor cell definitions.

Although embodiments of the present invention have been illustrated in the accompanying drawings and described in the foregoing description, it will be understood that the invention is not limited to the embodiments disclosed, but is capable of numerous rearrangements, modifications, and substitutions without departing from the spirit of the invention as set forth and defined by the following claims.

The invention claimed is:

1. A method in a radio base station, or base station controller, of a wireless telecommunications system for updating a neighbor cell list associated with a first cell served by said radio base station, said list containing elements that identify other cells that have a neighbor cell relationship with the first cell, wherein radio base stations in said system broadcast both a non-unique identity and a unique identity of the cells that they serve, the method comprising the steps of:
communicating with a mobile terminal in the first cell;
receiving from the mobile terminal a non-unique identification of a second cell detected by said mobile terminal;
comparing the non-unique identity of the second cell with elements in the neighbor cell list and, if an identity ambiguity exists, then:
instructing the mobile terminal to determine the unique cell identity of the second cell;
receiving unique cell identifier information relating to the second cell from the mobile terminal; and,
associating the non-unique cell identity of said second cell with the unique cell identity of said second cell in said neighbor cell list.

2. The method as claimed in claim 1, wherein said identity ambiguity exists if the second cell non-unique identity is not included in the neighbor cell list.

3. The method as claimed in claim 2, wherein said associating step comprises the step of adding said second cell non-unique and unique cell identities to the neighbor cell list.

4. The method as claimed in claim 1, wherein said identity ambiguity exists if the second cell non-unique cell identity is included in the neighbor cell list with information causing suspected ambiguity of identification.

5. The method as claimed in claim 1, wherein ambiguity exists if two unique cell identities in the neighbor cell list share the same non-unique cell identity.

6. The method as claimed in claim 4, wherein said associating step comprises associating said second cell non-unique and unique cell identities with the communication with the terminal for a predefined period.

7. The method as claimed in claim 4, wherein information on suspected ambiguity is added to a non-unique cell identity if a prior handover from the first cell to a cell with the non-unique cell identity has been unsuccessful.

8. The method as claimed in claim 1, wherein the instructing step is performed on the further condition that the second cell is determined to be a handover candidate.

9. The method as claimed in claim 1, comprising the further steps of:
broadcasting a non-unique identity of the first cell in a first information layer intended for carrying information for supporting the physical connection with the terminals; and,
broadcasting a unique identity of the first cell on an information layer higher than the first layer.

10. A method in a mobile terminal for facilitating the updating of a neighbor cell list associated with a first cell of a cellular telecommunications network, said list containing elements that identify other cells that have a neighbor cell relationship with the first cell, wherein non-unique cell identities and unique cell identities are broadcast by radio base stations in cells of said network, the method comprising the steps of:
communicating over a first link with a radio base station in a first cell;
detecting a non-unique cell identity broadcast by a radio base station in a second cell;
reporting the identified non-unique identity of said second cell over the first radio link;
receiving an instruction over the first radio link to detect the unique identity of said second cell;
detecting the unique cell identity broadcast in the second cell; and,
reporting the unique second cell identity by transmission over the first radio link to said radio base station in said first cell, whereby said unique cell identity of said second cell can be associated with its non-unique cell identity in said neighbor cell list for said first cell.

11. The method of claim 10, wherein the non-unique second cell identity is detected in a first layer carrying physical information.

12. The method of claim 10, wherein the unique second cell identity is detected in a second layer higher than the first layer.

13. A radio base station in a wireless telecommunications system comprising a plurality of cells, said base station adapted to update a neighbor cell list associated with a first cell served by said base station, said list containing elements that identify other cells that have a neighbor cell relationship with the first cell, said base station comprising:
a radio transceiver adapted to broadcast a non-unique identity and a unique identity of the first cell; and,
a controller including or coupled to a database that includes a neighbor cell list, the controller operative to:
receive, via the radio transceiver, a report, from a terminal on a non-unique cell identity of a second cell detected by said terminal;
match the non-unique cell identity of the second cell with a corresponding unique cell identity in said neighbor cell list; and, if ambiguity arises in the matching, initiate the sending of an instruction to the terminal to identify and report the unique cell identity of the second cell; and,
associate the non-unique cell identity of said second cell with the unique cell identity of said second cell as reported by the terminal.

14. A mobile terminal adapted to assist in the updating of a neighbor cell list associated with a first cell of a wireless telecommunications system, said list containing elements that identify other cells that have a neighbor cell relationship with the first cell, wherein a non-unique cell identifier and a unique cell identifier are broadcast in cells of said system, the mobile terminal comprising:
a radio transceiver; and, a controller arranged to identify, and report to a first radio base station through which said terminal is then communicating in said first cell, a non-unique cell identity of a second cell detected by said terminal, and further arranged to cause the transceiver to identify the unique cell identity of said second cell in response to an instruction received from the first radio base station, whereby said unique cell identity of said second cell can be associated with its non-unique cell identity in said neighbor cell list for said first cell.

15. The mobile terminal of claim 14, wherein the controller includes a cell identity (CID) detector for identifying the non-unique cell identity.

16. The mobile terminal of claim 14, wherein the controller includes a unique CID (UCID) detector for identifying the unique cell identity.

17. A method in a radio base station, or base station controller, of a wireless telecommunications system for updating a neighbor cell list associated with a first cell served by said radio base station, said list containing elements that identify other cells that have a neighbor cell relationship with the first cell, wherein radio base stations in said system broadcast both a non-unique identity and a unique identity of cells that they serve, the method comprising the steps of:

communicating with a mobile terminal in a first cell;

receiving from the mobile terminal a non-unique identification of a second cell detected by said mobile terminal;

comparing the non-unique identity of the second cell with elements in the neighbor cell list and, if an identity ambiguity exists, then:

instructing the mobile terminal to determine the unique cell identity of the second cell;

receiving unique cell identifier information relating to the second cell from the mobile terminal; and, associating the non-unique cell identity of said second cell with the unique cell identity of said second cell in said neighbor cell list;

wherein an identity ambiguity exists if:

the second cell non-unique identity is not included in the neighbor cell list;

the second cell non-unique cell identity is included in the neighbor cell list with information causing suspected ambiguity of identification; or, two unique cell identities in the neighbor cell list share the same non-unique cell identity.

* * * * *

UNITED STATES PATENT AND TRADEMARK OFFICE
CERTIFICATE OF CORRECTION

| | | |
|---|---|---|
| PATENT NO. | : 7,957,743 B2 | Page 1 of 1 |
| APPLICATION NO. | : 11/773752 | |
| DATED | : June 7, 2011 | |
| INVENTOR(S) | : Moe et al. | |

It is certified that error appears in the above-identified patent and that said Letters Patent is hereby corrected as shown below:

In Column 3, Line 11, delete "network;" and insert -- network. --, therefor.

In Column 5, Line 13, delete "first link." and insert -- first radio link. --, therefor.

In Column 5, Line 16, delete "first link" and insert -- first radio link. --, therefor.

In Column 5, Line 20, delete "first link" and insert -- first radio link. --, therefor.

In Column 5, Line 63, delete "form" and insert -- from --, therefor.

In Column 8, Line 3, in Claim 9, delete "cell" and insert -- cell, --, therefor.

In Column 8, Line 6, in Claim 9, delete "and," and insert -- and --, therefor.

In Column 8, Line 18, in Claim 10, delete "first link" and insert -- first radio link --, therefor.

In Column 8, Line 19, in Claim 10, delete "a first cell;" and insert -- the first cell; --, therefor.

In Column 8, Line 48, in Claim 13, delete "report," and insert -- report --, therefor.

In Column 10, Line 1, in Claim 17, delete "a first cell;" and insert -- the first cell; --, therefor.

Signed and Sealed this
Twentieth Day of September, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,957,743 B2 |
| APPLICATION NO. | : 11/773752 |
| DATED | : June 7, 2011 |
| INVENTOR(S) | : Johan Moe |

It is certified that error appears in the above-identified patent and that said Letters Patent is hereby corrected as shown below:

On the cover (bibliographic data): Please add

Foreign Priority Claim:

This application claims priority to PCT/EP07/01737 filed on February 28, 2007.

Signed and Sealed this
Tenth Day of April, 2012

David J. Kappos
*Director of the United States Patent and Trademark Office*

Disclaimer

7,957,743—Johan Moe, Mantrop (SE); Harald Kallin, Sollentuna (SE). SELF CONFIGURING AND OPTIMIZATION OF CELL NEIGHBORS IN WIRELESS TELECOMMUNICATIONS NETWORKS. Patent dated June 7, 2011. Disclaimer filed Dec. 14, 2012, by the assignee Telefonaktiebolaget L M Ericsson.

The term of this patent shall not extend beyond the expiration date of Patent No. 7,957,743.

(*Official Gazette, January 29, 2013*)